(12) United States Patent
Salter et al.

(10) Patent No.: US 11,970,137 B2
(45) Date of Patent: Apr. 30, 2024

(54) VEHICLE HAVING A STORAGE COMPARTMENT WITH A DEPLOYABLE SHELF

(71) Applicant: Ford Global Technologies, LLC, Dearborn, MI (US)

(72) Inventors: Stuart C. Salter, White Lake, MI (US); David Brian Glickman, Southfield, MI (US); Jeff Robert Seaman, Brownstown, MI (US); Annette Lynn Huebner, Highland, MI (US); George Abram Thornton, Canton, MI (US); Michael John Harmon, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 17/903,387

(22) Filed: Sep. 6, 2022

(65) Prior Publication Data

US 2024/0075883 A1 Mar. 7, 2024

(51) Int. Cl.
*B60R 5/02* (2006.01)
*B60P 1/36* (2006.01)
*B62D 25/08* (2006.01)

(52) U.S. Cl.
CPC .............. *B60R 5/02* (2013.01); *B60P 1/36* (2013.01); *B62D 25/087* (2013.01)

(58) Field of Classification Search
CPC ...... B60P 1/36; B60P 1/38; B60R 5/02; B60R 5/04; B60R 5/041; B60R 9/06; B62D 25/087
USPC ............................................ 296/24.44, 37.5
See application file for complete search history.

(56) References Cited

U.S. PATENT DOCUMENTS

| | | | |
|---|---|---|---|
| 6,733,094 B1 | 5/2004 | Chang | |
| 10,618,447 B2 * | 4/2020 | Putcha | ............... B60P 3/20 |
| 10,934,093 B2 | 3/2021 | Gil | |
| 2008/0231067 A1 | 9/2008 | Nagle | |
| 2009/0072567 A1 * | 3/2009 | Bohlke | ............... B60R 5/045 |
| | | | 242/389 |
| 2022/0297939 A1 * | 9/2022 | Chen | ............... B60P 1/6436 |
| 2023/0398939 A1 * | 12/2023 | Hannan | ............... B60R 5/02 |

FOREIGN PATENT DOCUMENTS

| | | | | |
|---|---|---|---|---|
| DE | 10055826 A1 * | 5/2002 | ............... B60P 1/003 |
| GB | 2538823 A | 11/2016 | |

* cited by examiner

*Primary Examiner* — Jason S Daniels
(74) *Attorney, Agent, or Firm* — Vichit Chea; Price Heneveld LLP

(57) ABSTRACT

A vehicle includes a storage compartment, a belt conveyor located in the storage compartment and having a slat belt supported by a pair of rollers, and a shelf operatively coupled to the slat belt and configured to move between a lower stowed position within the storage compartment and an upper deployed position extending outward from the storage compartment.

20 Claims, 10 Drawing Sheets

VEHICLE HAVING A STORAGE COMPARTMENT WITH A DEPLOYABLE SHELF

FIELD OF THE DISCLOSURE

The present disclosure generally relates to vehicles having storage compartments, and more particularly relates to a vehicle storage compartment with a deployable shelf.

BACKGROUND OF THE DISCLOSURE

Motor vehicles are commonly configured with storage compartments such as a rear trunk at the rear of the vehicle and a front trunk referred to as a frunk at the front of the vehicle. Items may be stored and transported in the vehicle within the storage compartments. It may be desirable to provide for a storage compartment having a deployable shelf to present an item from within the storage compartment.

SUMMARY OF THE DISCLOSURE

According to a first aspect of the present disclosure, a vehicle is provided and includes a storage compartment, a belt conveyor located in the storage compartment and having a belt that rotates, and a shelf operatively coupled to the belt and configured to move with the belt between a lower stowed position and an upper deployed position extending outward from the storage compartment.

Embodiments of the first aspect of the present disclosure can include any one or a combination of the following features:
- the belt conveyor comprises a first roller and a second roller to support the belt;
- an actuator to actuate at least one of the first and second rollers to move the belt to move the shelf between the lower stowed position and the upper deployed position;
- the shelf further extends horizontally in the upper deployed position to extend outward from the storage compartment;
- the shelf remains substantially horizontal in the upper deployed position and the lower stowed position;
- the shelf comprises a first panel that slides relative to a second panel;
- the shelf further comprises a third panel that slides relative to the second panel;
- the first panel is operatively coupled to the second panel via a pin disposed in a slot;
- a bracket connecting the shelf to a slat or the belt;
- the storage compartment comprises a front storage compartment proximate to a front end of the vehicle; and
- the front storage compartment comprises a lid movable between an open position and a closed position.

According to a second aspect of the present disclosure, a vehicle is provided and includes a trunk having a storage compartment and a lid, a belt conveyor located in the storage compartment and having a slat belt supported by first and second rollers to rotate the slat belt, and a shelf operatively coupled to the slat belt and configured to move with the slat belt between a lower stowed position within the storage compartment and an upper deployed position extending from the storage compartment, and further configured to move outward from the storage compartment.

Embodiments of the second aspect of the present disclosure can include any one or a combination of the following features:
- an actuator to actuate at least one of the first and second rollers to move the slat belt to move the shelf between the lower stowed position and the upper deployed position;
- the shelf remains substantially horizontal in the upper deployed position and the lower stowed position;
- the shelf comprises a first panel that slides relative to a second panel;
- the shelf further comprises a third panel that slides relative to the second panel;
- the first panel is operatively coupled to the second panel via a pin disposed in a slot;
- a bracket connecting the shelf to the slat belt;
- the storage compartment comprises a front storage compartment proximate to a front end of the vehicle; and
- the lid is movable between an open position and a closed position.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
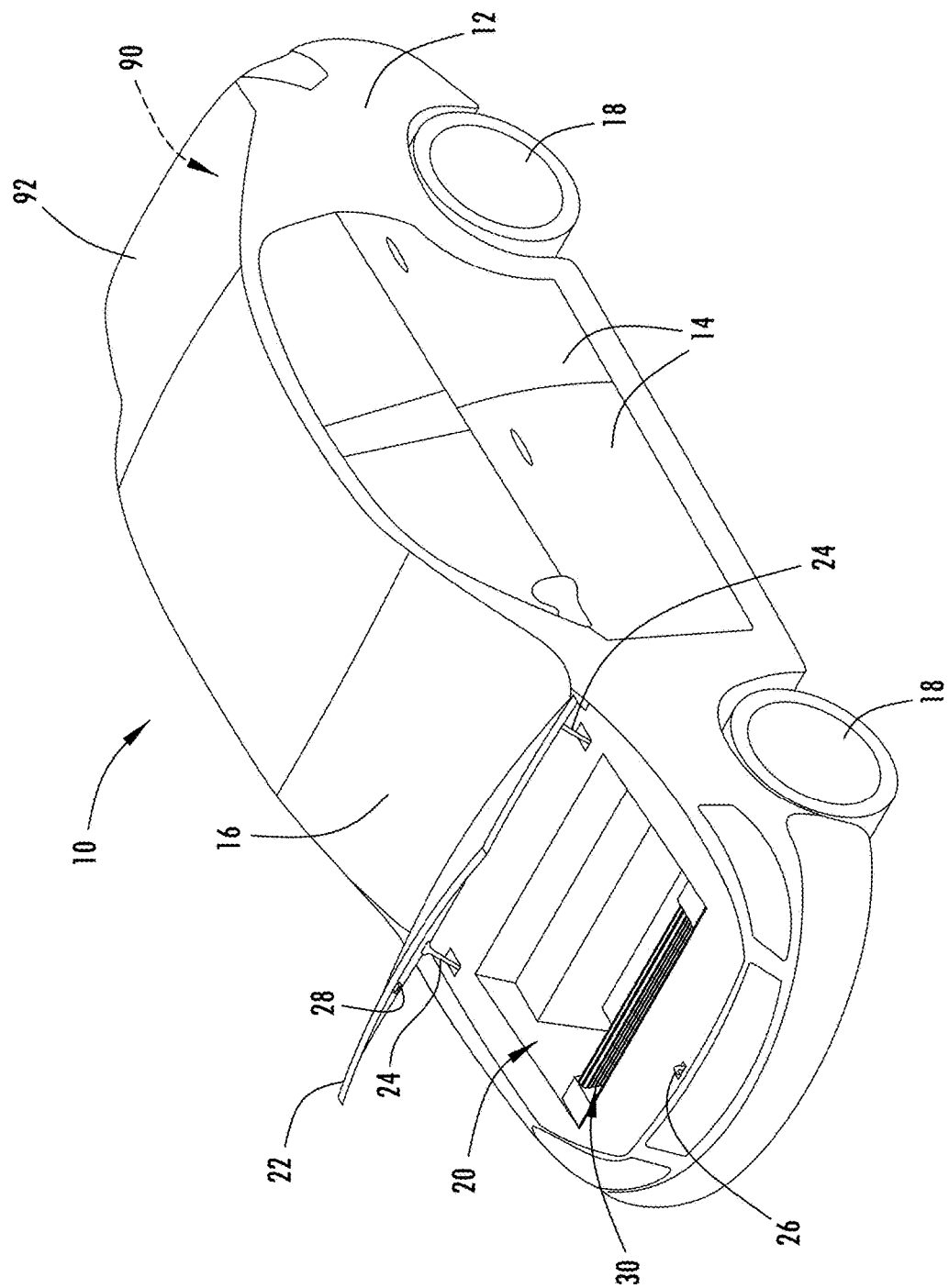
FIG. 1 is a perspective view of a motor vehicle having a front storage compartment equipped with a belt conveyor system providing a deployable shelf, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle having a belt conveyor with a deployable shelf in a storage compartment. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a wheeled automotive or motor vehicle 10 is generally illustrated as a passenger vehicle which may be configured with passenger seating for transporting one or more passengers including a driver of the vehicle and configured with storage compartments available to transport and store items. The motor vehicle 10 has a vehicle body 12 and may include a plurality of passenger doors 14, a windshield 16, a front storage compartment 20 and a rear storage compartment 90. The motor vehicle 10 has a plurality of road wheel assemblies 18. The body 12 may define a cabin interior configured to include a plurality of passenger seats and other features for allowing occupants including a driver to drive the vehicle and passengers to be seated and transported therein. The cabin interior may include additional storage compartments for storing and transporting items.

The vehicle 10 includes a front storage compartment 20 which may be referred to as a front trunk, also referred to as a frunk, which is generally defined by the body 12 and an overlying lid 22 which may also be referred to as a hood. The lid 22 may pivot via a pair of hinges 24 between a closed position covering the storage compartment 20 and an open position as shown allowing access to the storage compartment 20. The lid 22 may include a latch assembly such as a striker 28 on the bottom front end configured to engage a latch 26 near the front end on the vehicle body 12 to fasten the hood or lid 22 in the closed position. The vehicle 10 may be equipped with a release mechanism to release the latch 26 to allow the lid 22 to move to the open position and expose the front storage compartment 20.

Figure 1A:
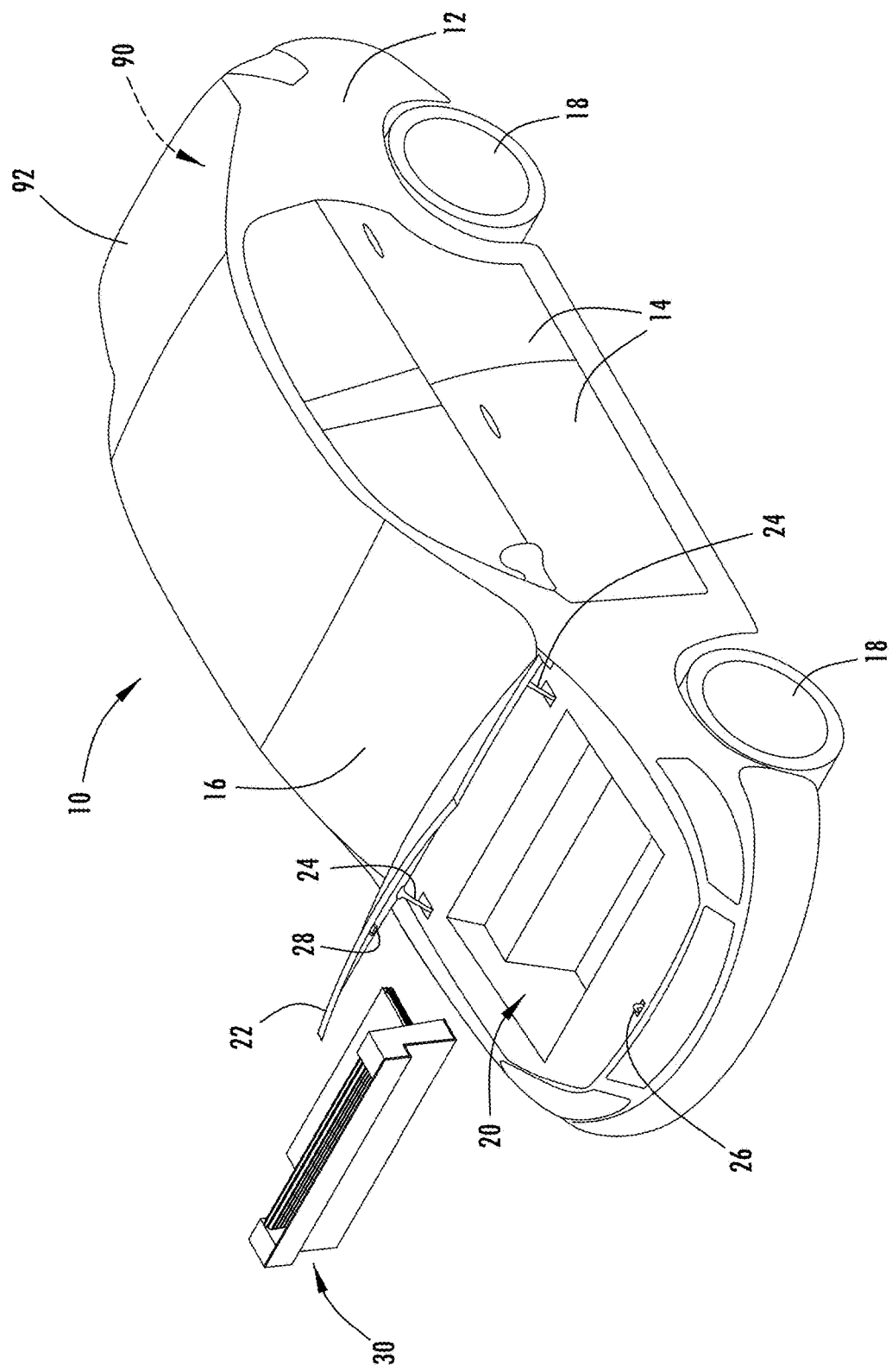
FIG. 1A is a partial exploded view of the motor vehicle having the belt conveyor system exploded from the storage compartment.
Figure 2:
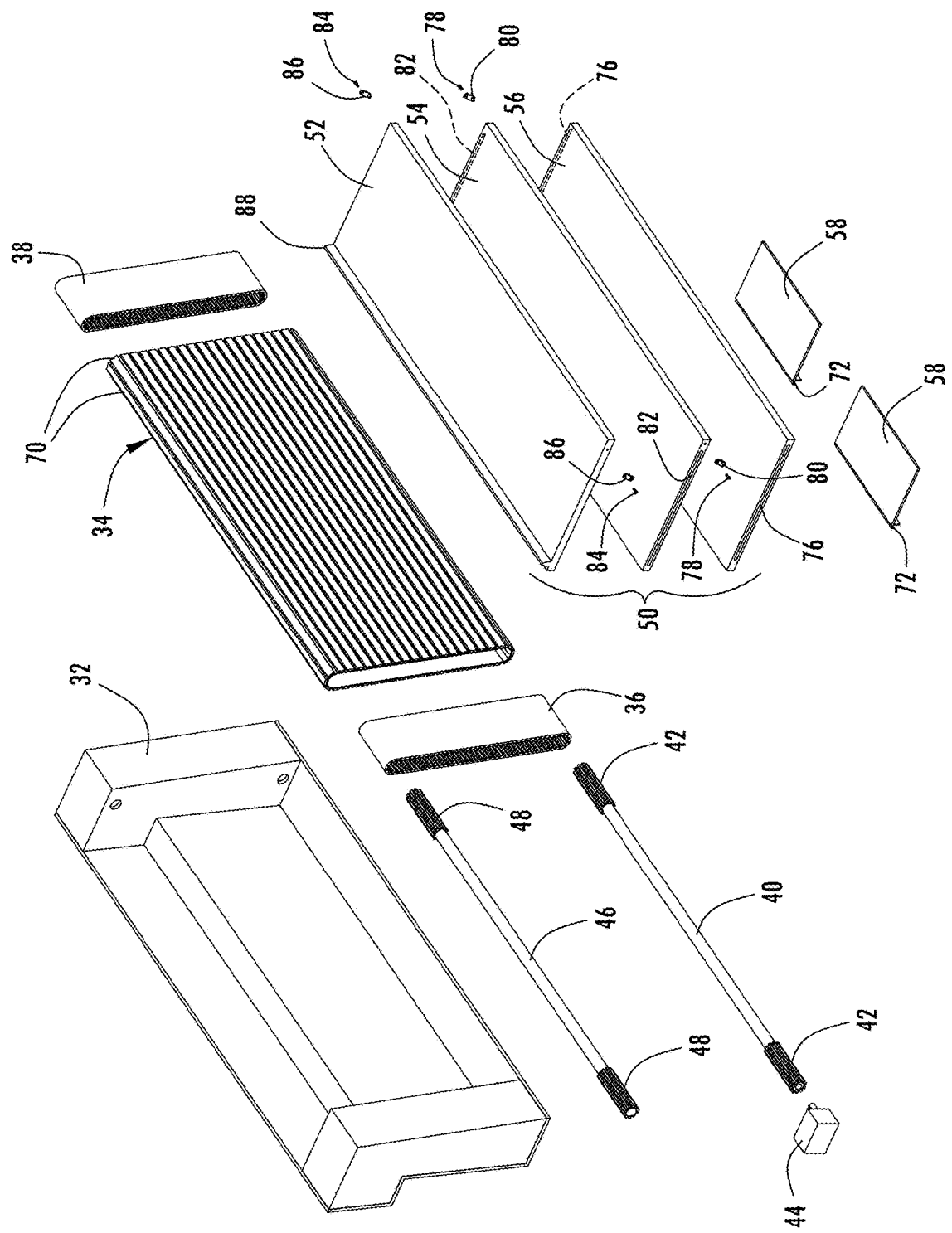
FIG. 2 is an exploded view of the belt conveyor system with the deployable shelf shown in FIG. 1A.

As seen in FIGS. 1 and 1A, the front storage compartment 20 of the vehicle 10 is equipped with a belt conveyor system 30 having a deployable shelf, according to one embodiment. The belt conveyor system 30 is shown disposed within the front storage compartment 20 generally supported on the floor and/or interior walls and operates to move a deployable shelf between a first lower stowed position and a second upper deployed position as described herein. It should be appreciated that the belt conveyor system 30 advantageously may be used to move one or more items from the first lower stowed position within a lower portion of the storage compartment 20 to the exposed second upper deployed position extending upward and outward from the storage compartment 20. While the belt conveyor system 30 is shown located in the front storage compartment 20, it should be appreciated that the belt conveyor system 30 may likewise or alternatively be located within other storage compartments such as the rear storage compartment 90 or in interior located storage compartment such as a center console storage compartment, for example.

Referring to FIGS. 2-5A, the belt conveyor system 30 is illustrated having a housing 32 which may be supported on the underlying floor in the front storage compartment 20. The housing 32 may be fastened or otherwise attached to the front storage compartment such that the housing 32 remains fixed within the storage compartment 20. The belt conveyor system 30 includes a slat belt 34 shown configured in an endless loop having a plurality of elongated slats 70 interconnected to the belt 34. The belt 34 and slats 70 may be made of a polymeric material such as rubber, for example. The slat belt 34 is coupled to drive belts 36 and 38 on opposite lateral ends. Each of drive belts 36 and 38 engage the slat belt 34 to drive the slat belt 34 to rotate about the endless loop. First and second rollers 46 and 40 shown in the shape of rods with toothed sprockets 46 and 48 on the ends are disposed to interconnect the drive belts 36 and 38. Rod 40 is configured as a drive rod coupled to an actuator, such as an electric motor 44. Motor 44 has an output shaft that rotates the drive rod 40 which, in turn, matingly engages and rotates the drive belts 36 and 38 via toothed sprockets 42 to rotate the slat belt 34 about the endless loop. The toothed sprocket 42 has teeth that engage recesses 62 provided between raised portions 60 on the inner side of the belt 34. Rod 46 is configured as a follower rod with toothed sprockets 48 located at an opposite end of the drive belts 36 and 38. It should be appreciated that either or both of the rods 40 and 46 may be the drive rod.

Figure 3:
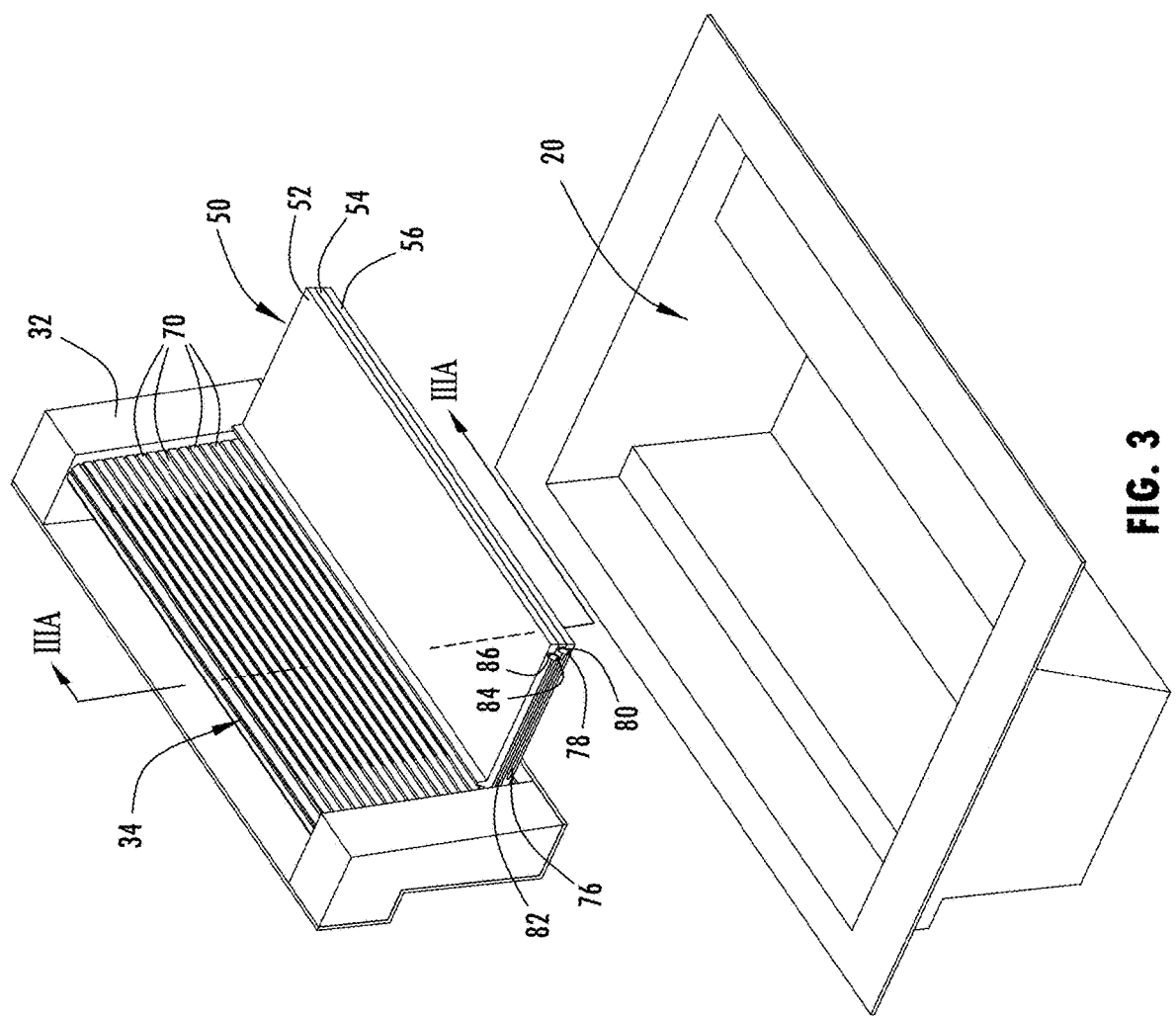
FIG. 3 is a partial exploded view of the belt conveyor system and deployable shelf removed from the storage compartment.
Figure 3A:
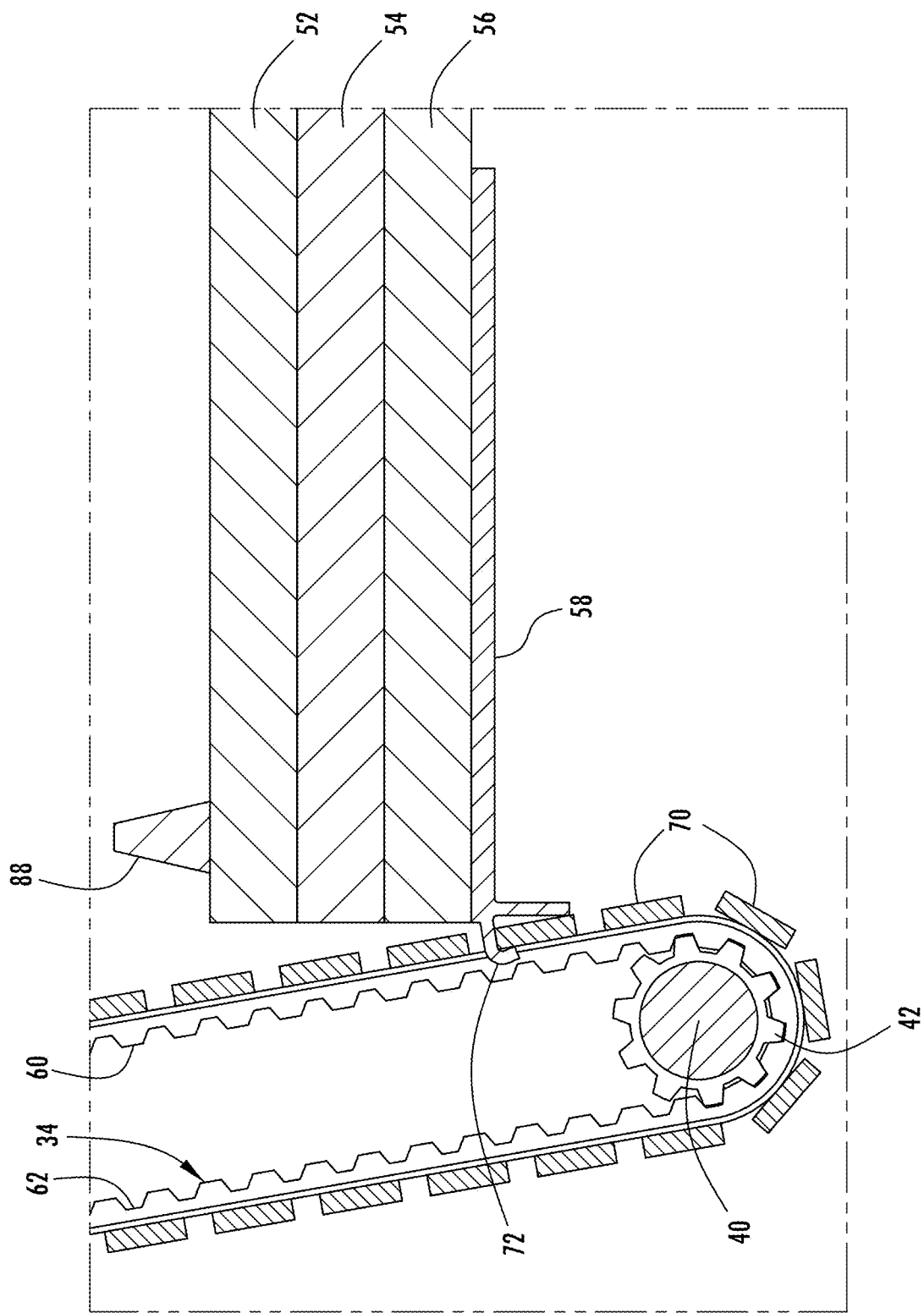
FIG. 3A is a cross-sectional view taken through lines IIIA-IIIA of FIG. 3 showing the deployable shelf in a first lower stowed position.
Figure 4:
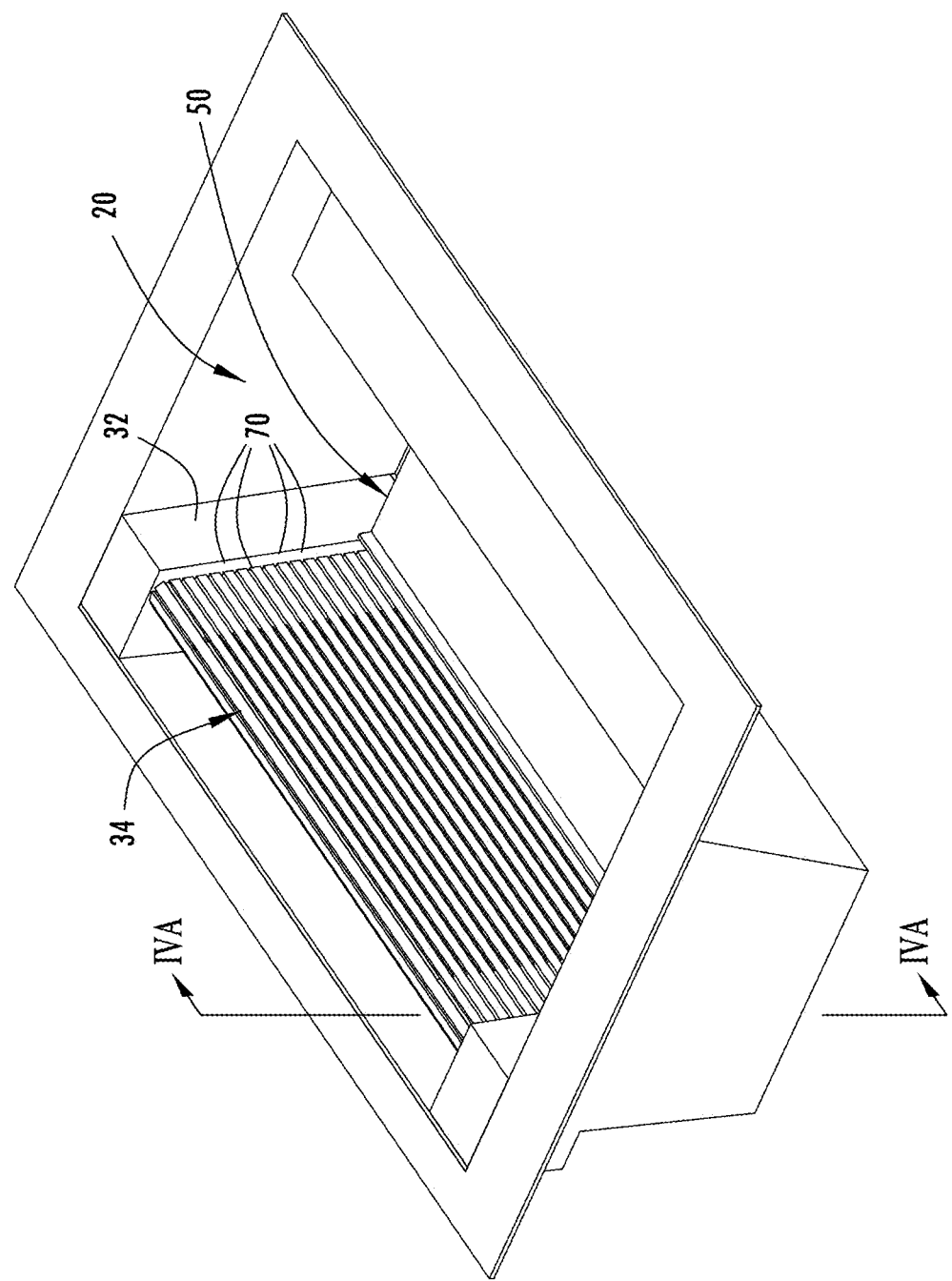
FIG. 4 is a perspective view of the belt conveyor system with the deployable shelf shown in the first lower stowed position.
Figure 4A:
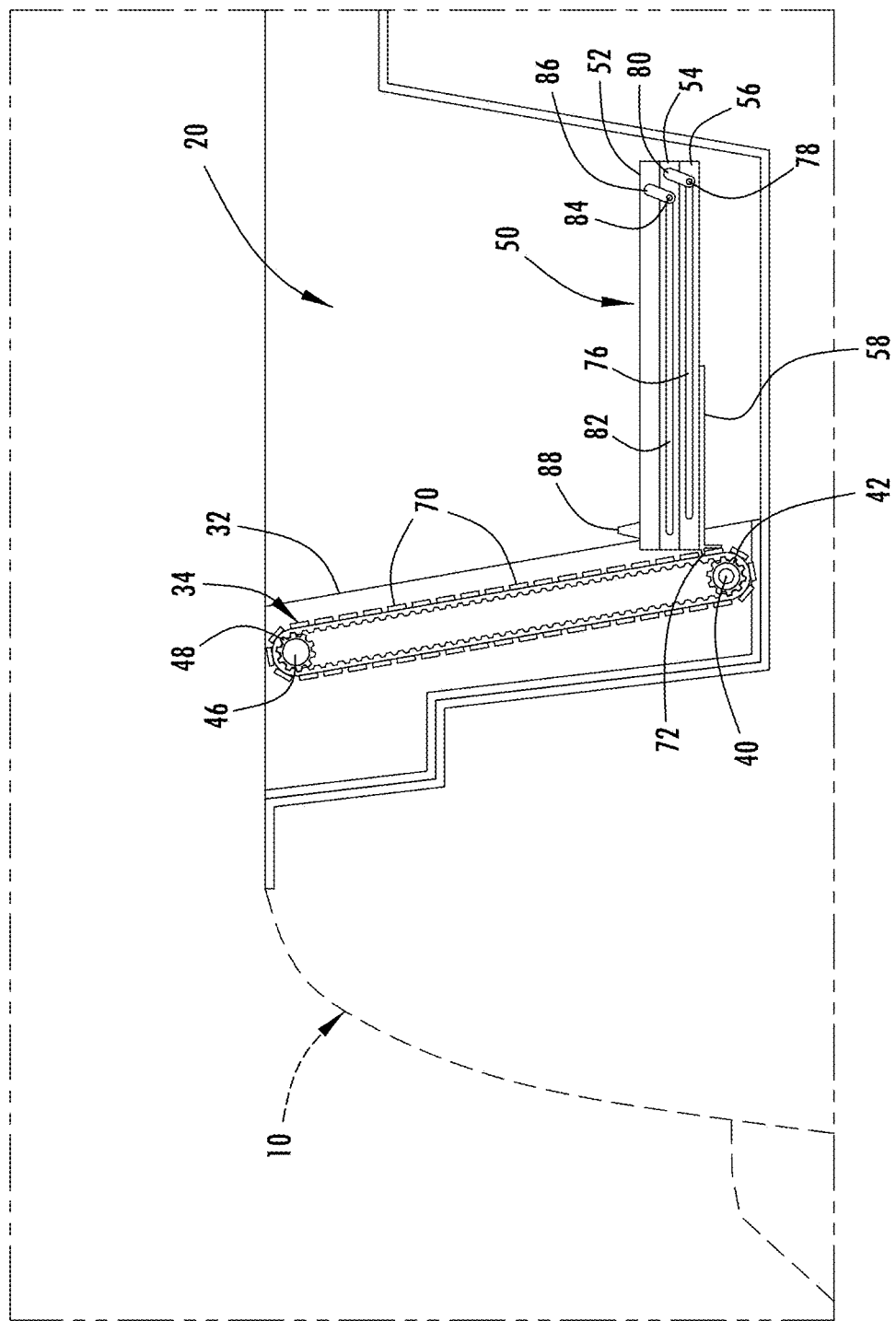
FIG. 4A is a cross-sectional view taken through line IVA-IVA of FIG. 4 further illustrating the deployable shelf in the first lower stowed position.
Figure 5:
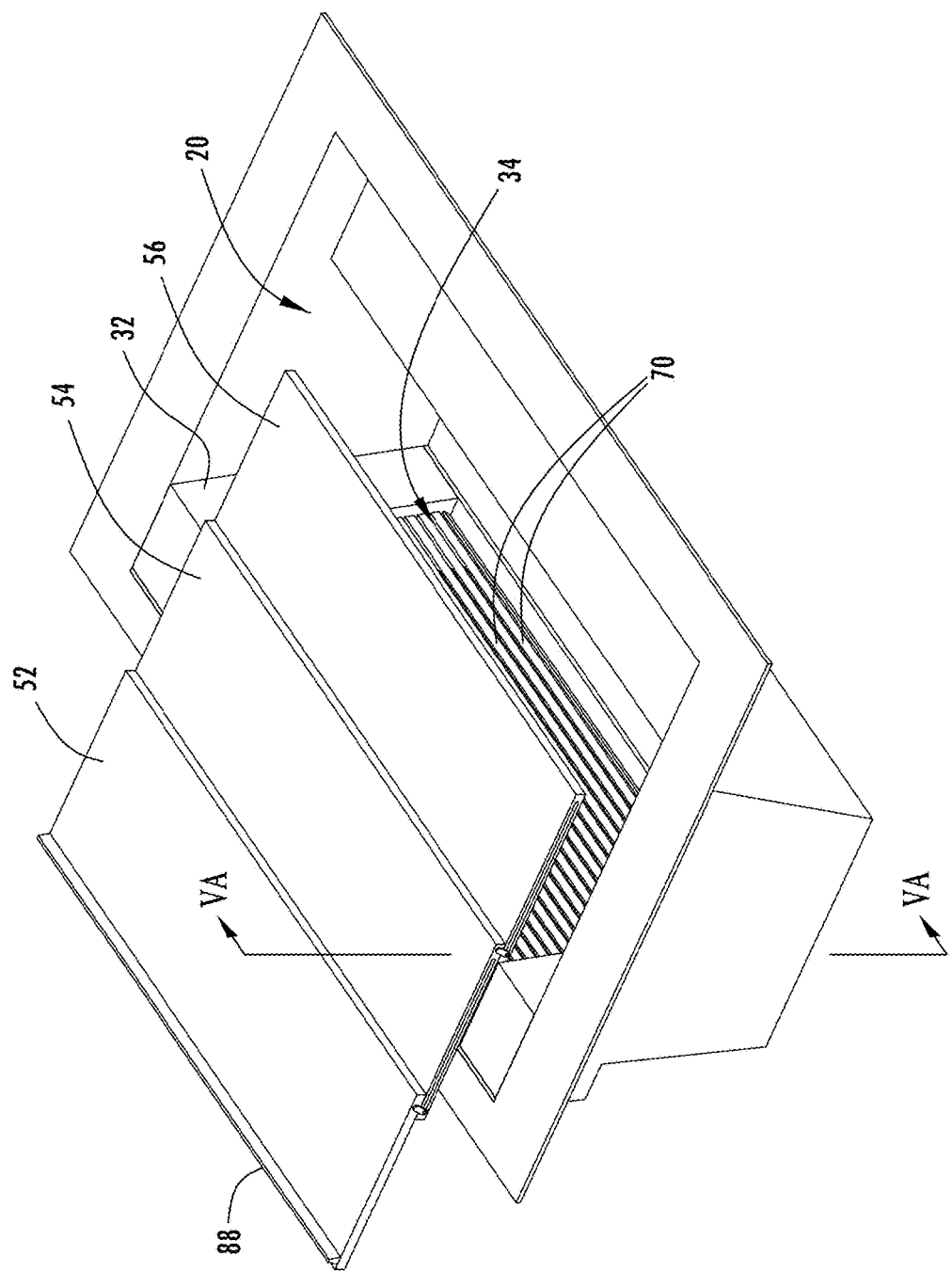
FIG. 5 is a perspective view of the belt conveyor system with the deployable shelf shown in a second upper deployed position.
Figure 5A:
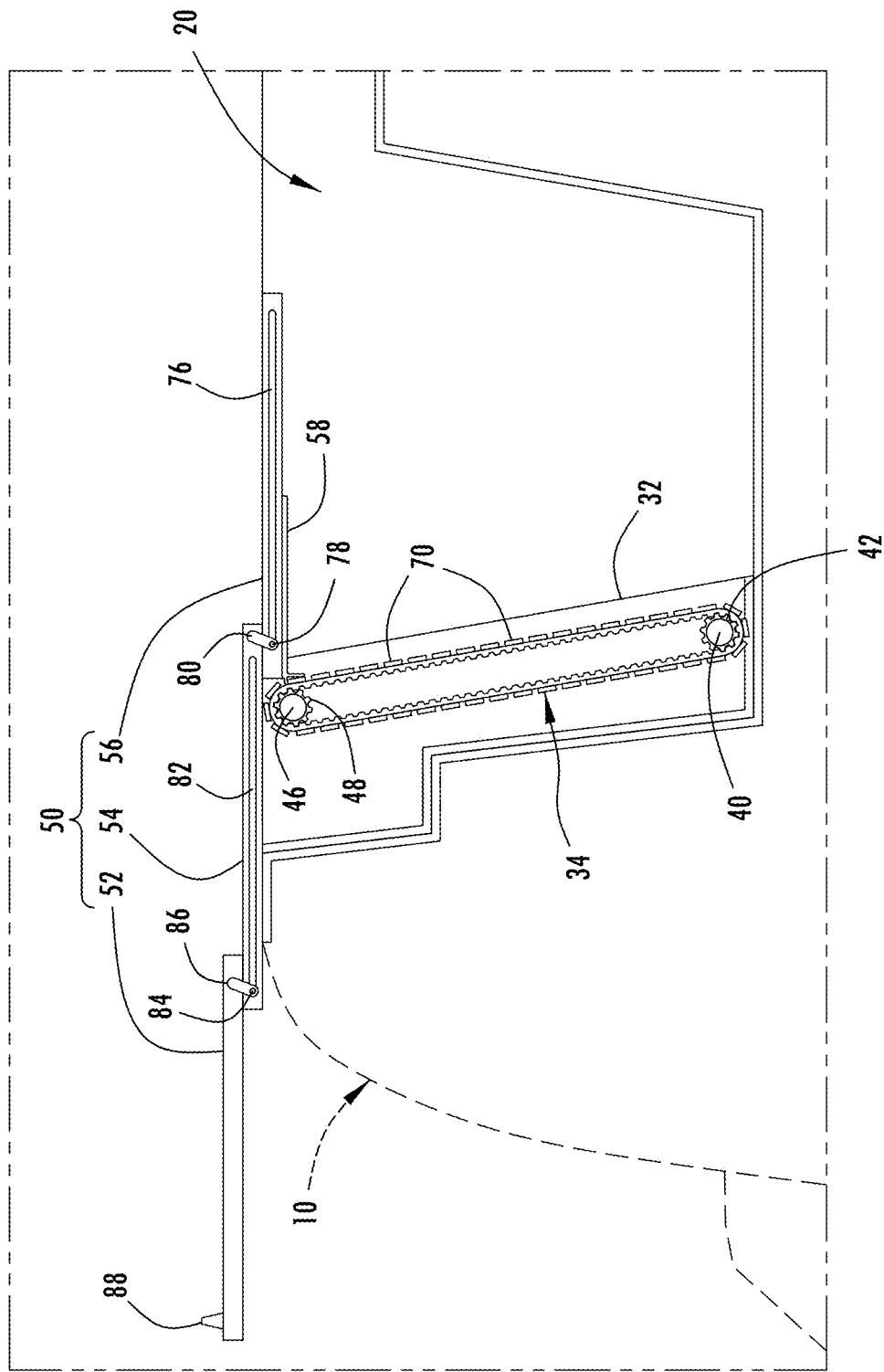
FIG. 5A is a cross-sectional view taken through line VA-VA of FIG. 5 further illustrating the deployable shelf in the second upper deployed position.

The belt conveyor system 30 includes a shelf operatively coupled to the slat belt 34 that is configured to move between a first lower stowed position shown in FIGS. 3-4A and a second upper deployed position shown in FIGS. 5 and 5A. The shelf 50 has three deployable panels 52, 54 and 56 which are generally stacked and overlay one another in the first lower stowed position. The shelf 50 is operatively coupled to the slat belt 34 by a pair of support brackets 58 on the bottom side thereof. The support brackets 58 generally include an elongated underlying rigid support and have an attachment features 72 located at one end to attach to the slat belt 34 as seen in FIG. 3A. The attachment feature 72 may include an L-shaped member having an overhanging flange that engages the slat belt 34 to maintain the shelf 50 in a fixed position on the slat belt 34. In doing so, the support brackets 58 support and maintain the shelf 50 in a generally horizontal position in the first lower stowed position, the second upper deployed position and other positions that are between the first lower stowed position and the second upper deployed position.

The deployable shelf 50 may be actuated to move between the first lower stowed position within a lower portion of the storage compartment 20 to the second upper deployed position by activating the motor 44 to actuate the drive rod 40 to rotate the drive belts 36 and 38 to rotate the slat belt 34 and raise or lower the shelf 50 between the first lower stowed position to the second upper deployed position. When the shelf 50 is raised to the second upper deployed position, the shelf 50 may be further deployed to a third deployed position as seen in FIGS. 5 and 5A by extending panels 52, 54 and 56 horizontal relative to one another. The top panel 52 has an elevated member 88 on the front end to prevent items from sliding forward. The top panel 52 has a first connecting arm 86 coupled to a first pin 84 that engages a first slot 82 in the second panel 54 such that the first panel 52 is able to extend horizontally relative to the second panel 54. The second panel 54 likewise has a second support arm 80 coupled to a second pin 78 which engages a second slot 76 in the bottom third panel 56 such that the second panel 54 may likewise move horizontally forward relative to the third panel 56. As such, the second panel 54 may slide vehicle forward relative to the bottom third panel 56 and the upper first panel 52 may slide forward of the second panel 54 so as to extend the shelf 50 vehicle forward as seen in FIGS. 5 and 5A. Movement of the first and second panels 52 and 54 relative to the third panel 56 may occur with force applied manually or may include an actuator such as an electric motor. It should be appreciated that the shelf 50 may therefore hold an item that is raised and then extended vehicle forward to present the item to a user at the front end of the vehicle 10 above and forward of the storage compartment, according to the example shown. The shelf 50 may be moved back to the first lower stowed position to store the item in the storage compartment 20 by stacking the shelf 50 and lowering it with the belt.

Figure 6:
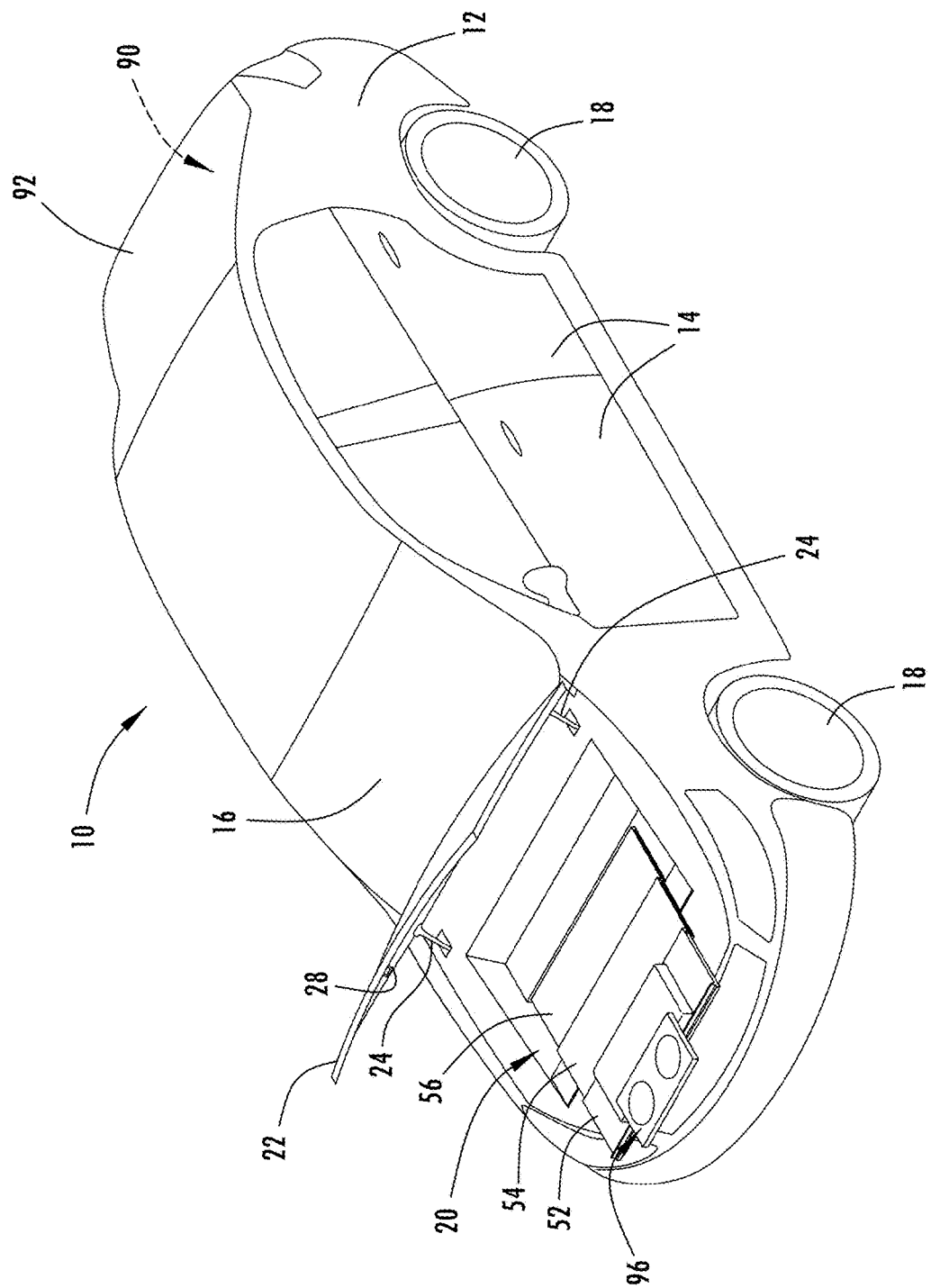
FIG. 6 is a perspective view of a motor vehicle equipped with the belt conveyor system with the deployable shelf in the second upper deployed use position holding a cooktop, according to one example.

Referring to FIG. 6, one example of an item presented to a user on the fully deployed shelf 50 is shown, according to one example. In this example, the item carried on top of the shelf 50 is a warming device such as a cooktop 96. As such, a user of the vehicle may deploy the cooktop 96 and may utilize the cooktop to heat or cook food, for example. The item presented on the shelf 50 may be another item such as a display screen that may be stowed within the storage compartment 50 and deployed to a use positon for viewing by a user outside of the vehicle 10. It should be appreciated that other articles or items may be carried by the shelf 50 to move the items between a stowed position within the storage compartment 50 and an outward extended use position as described herein.

Accordingly, the vehicle 10 advantageously provides for a storage compartment 20 having a belt 34 coupled to a deployable shelf 50 that may hold and stow items in a lower stored position within the storage compartment 20 and convey or transport those items to a user in an upper deployed position. It should be appreciated that the belt conveyor system 30 may be operated when the lid 22 is in the open position to allow access to the storage compartment and the vehicle 10 is parked and not operating and not moving.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle comprising:
   a storage compartment;
   a belt conveyor located in the storage compartment and having a belt that rotates; and
   a shelf operatively coupled to the belt and configured to move with the belt between a lower stowed position and an upper deployed position extending outward from the storage compartment.

2. The vehicle of claim 1, wherein the belt conveyor comprises a first roller and a second roller to support the belt.

3. The vehicle of claim 1 further comprising an actuator to actuate at least one of the first and second rollers to move the belt to move the shelf between the lower stowed position and the upper deployed position.

4. The vehicle of claim 3, wherein the shelf further extends horizontally in the upper deployed position to extend outward from the storage compartment.

5. The vehicle of claim 4, wherein the shelf remains substantially horizontal in the upper deployed position and the lower stowed position.

6. The vehicle of claim 5, wherein the shelf comprises a first panel that slides relative to a second panel.

7. The vehicle of claim 6, wherein the shelf further comprises a third panel that slides relative to the second panel.

8. The vehicle of claim 7, wherein the first panel is operatively coupled to the second panel via a pin disposed in a slot.

9. The vehicle of claim 1 further comprising a bracket connecting the shelf to a slat or the belt.

10. The vehicle of claim 1, wherein the storage compartment comprises a front storage compartment proximate to a front end of the vehicle.

11. The vehicle of claim 10, wherein the front storage compartment comprises a lid movable between an open position and a closed position.

12. A vehicle comprising:
 a trunk having a storage compartment and a lid;
 a belt conveyor located in the storage compartment and having a slat belt supported by first and second rollers to rotate the slat belt; and
 a shelf operatively coupled to the slat belt and configured to move with the slat belt between a lower stowed position within the storage compartment and an upper deployed position extending from the storage compartment, and further configured to move outward from the storage compartment.

13. The vehicle of claim 12 further comprising an actuator to actuate at least one of the first and second rollers to move the slat belt to move the shelf between the lower stowed position and the upper deployed position.

14. The vehicle of claim 13, wherein the shelf remains substantially horizontal in the upper deployed position and the lower stowed position.

15. The vehicle of claim 14, wherein the shelf comprises a first panel that slides relative to a second panel.

16. The vehicle of claim 15, wherein the shelf further comprises a third panel that slides relative to the second panel.

17. The vehicle of claim 16, wherein the first panel is operatively coupled to the second panel via a pin disposed in a slot.

18. The vehicle of claim 12 further comprising a bracket connecting the shelf to the slat belt.

19. The vehicle of claim 12, wherein the storage compartment comprises a front storage compartment proximate to a front end of the vehicle.

20. The vehicle of claim 12, wherein the lid is movable between an open position and a closed position.

* * * * *